United States Patent [19]
Liao

[11] Patent Number: 5,833,137
[45] Date of Patent: Nov. 10, 1998

[54] VIEW TANK

[76] Inventor: Chih-Hsueh Liao, P.O. Box 10780, Taipei, Taiwan

[21] Appl. No.: 837,111

[22] Filed: Apr. 14, 1997

[51] Int. Cl.[6] ................................................. A01G 15/00
[52] U.S. Cl. ........................... 239/14.1; 239/70; 239/71; 239/124; 239/302; 47/62 A
[58] Field of Search ............................. 239/14.1, 70, 71, 239/74, 124, 136, 302; 47/62 A, 62 R, 60, 60 EC; 128/200.14, 203.16, 203.17, 203.26, 203.27; 220/501, 502, 504; 261/24, 34.1, 72.1, DIG. 4, DIG. 15, DIG. 65

[56] References Cited

U.S. PATENT DOCUMENTS

| | | | |
|---|---|---|---|
| 4,396,557 | 8/1983 | DeLuca | 261/30 |
| 4,543,744 | 10/1985 | Royster | 47/60 |
| 4,764,660 | 8/1988 | Swiatosz | 239/136 |
| 5,341,595 | 8/1994 | Griggs et al. | 47/60 |

Primary Examiner—Andres Kashnikow
Assistant Examiner—Lisa Ann Douglas
Attorney, Agent, or Firm—Bacon & Thomas

[57] ABSTRACT

A view tank including an upper partition plate and a lower partition plate dividing the tank body into an upper section, a middle section, and a lower section. The walls of the middle section are transparent and openable for planting purposes. The lower section is a water storage section, and water is pumped to a fog generating box for generating fog. Excessive water flows down from the upper portion of the middle section. The upper section has a light for illuminating the middle section, and a fan for blowing the hot air in the upper and middle sections to the outer rim of the transparent walls of the middle section so as to remove water moisture on the walls. The respective walls of the three sections may be fabricated into integral units which are then assembled as a whole.

17 Claims, 8 Drawing Sheets

VIEW TANK

BACKGROUND OF THE INVENTION

1. Field of the Invention

The present invention relates generally to a view tank, and more particularly to a view tank in which landscapes and natural habitats may be simulated; the view tank has a special defogging device at the viewing walls.

2. Description of the Prior Art

In the prior art, there was a design concerning an indoor flower culture tank, which essentially comprises an enclosed tank having a cover and a base. The tank further has an openable door and a light. However, such a culture tank cannot be used as a view tank for growing plants. The problems are: (1) The plants may easily die due to poor air ventilation. (2) The considerable difference between the tank temperature and the ambient temperature will easily cause water moisture to condense on the walls. (3) As no automatic water supply device is provided, it is necessary to open the door of the tank to manually water the flowers. (4) There is no timer to control the light. Besides, there is no pump or air pump, or fog generating means. (5) The components or elements of the tank are visible from the outside, which is not pleasing in appearance. (6) There are no foggy or misty effects.

There is available on the market a kind of ice box for keeping fresh flowers. However, although it is equipped with a temperature controller to control the temperature of the ice box, it does not have good dehumidification control. There is no water supply and discharge device. Nor is there any fog generating means. Such a structure is therefore not suitable for use as an indoor view tank.

SUMMARY OF THE INVENTION

A primary object of the present invention is to provide a view tank which may simulate a pastoral scene or landscape with running water and fogging effects, and which is provided with a defogging device.

Another object of the present invention is to provide a view tank having an electric power control device for controlling operation of a water pump, a light, a fan, and a fog generating device.

A further object of the present invention is to provide a view tank with a water level indicator and a water discharge device for keeping the water in the tank at a suitable level.

Still another object of the present invention is to provide a view tank provided with partition plates which cannot be seen through from an opposite direction so that the upper and lower sections of the tank are not visible from the middle section of the tank.

Still a further object of the present invention is to provide a view tank provided with water-proof walls surrounding an openable wall of the tank.

Yet another object of the present invention is to provide a view tank which is comprised of a plurality of integral units assembled together as a whole.

In order to achieve the above-mentioned objects, the view tank of the present invention essentially comprises a view tank which is divided into an upper section, a middle section, and a lower section, and devices arranged in each section. The view tank may be a tank substantially maintained to be enclosed, or constituted by three independent tank units.

Whether the view tank is a single tank structure or an assembly of three tank units, it is provided with an upper lid. In the single tank embodiment, there is an upper partition plate in the tank body for dividing the tank body into an upper section and a middle section. A guide duct and a fan are disposed in the upper section for guiding the hot air to the outer rim of the transparent walls of the middle section for defogging purposes. The middle section is further provided with an openable wall.

The view tank further has a lower partition plate for dividing the tank body into a middle section and a lower section. The lower section has a water reservoir with a pump for pumping the water via a guide duct to the fog generating box, and via another guide duct to a sprinkle valve of the middle section for supplying water required for generating fog and by the plants. The view tank is provided with an electric power control device disposed at a suitable position, and a control switch and a timer are provided for controlling the light, the fog generator in the fog generating box, and the pump. The lower section where the pump is located further has a water level indicator and a water discharge valve.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
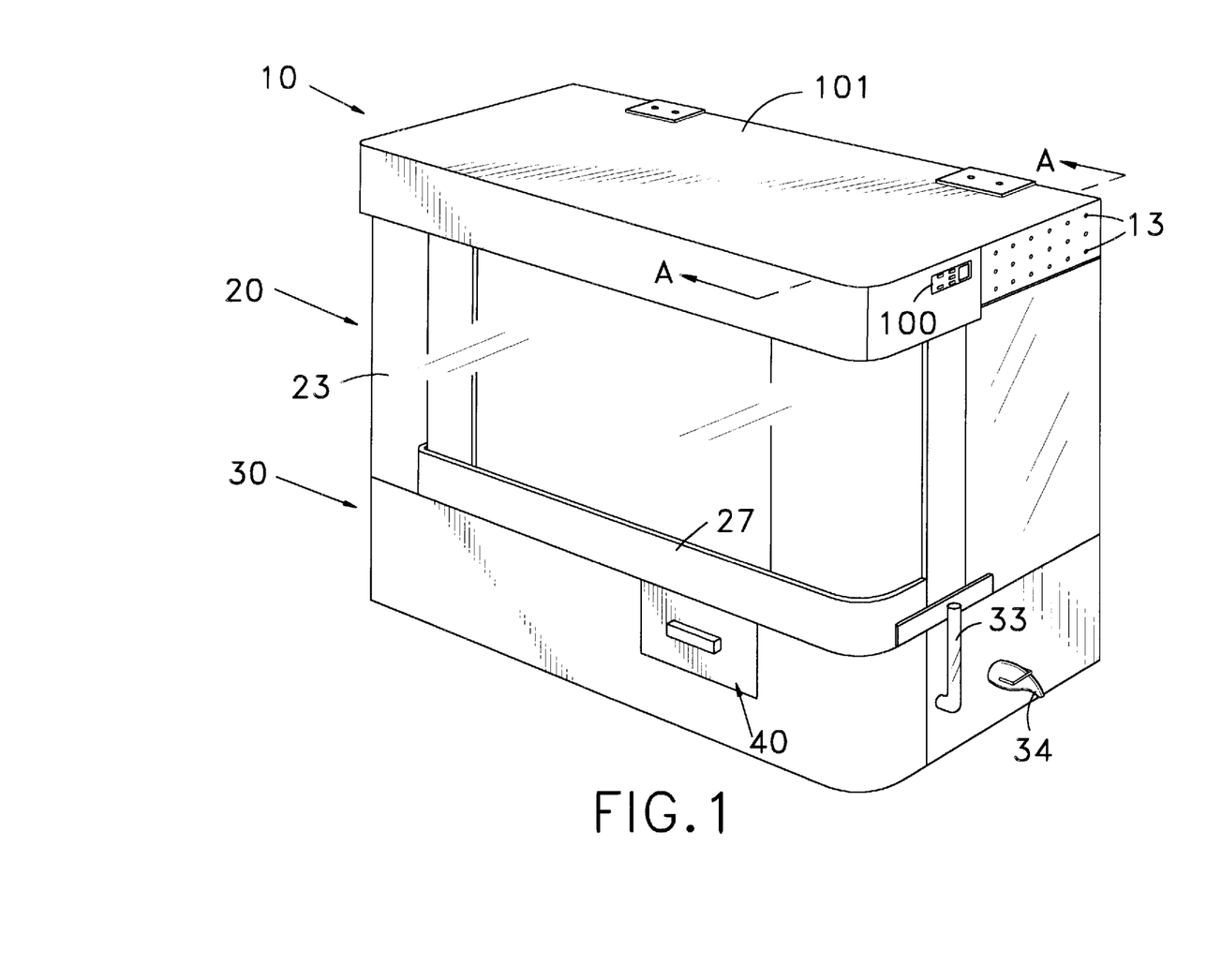
FIG. 1 is an elevational view of the view tank according to the present invention.
Figure 1A:
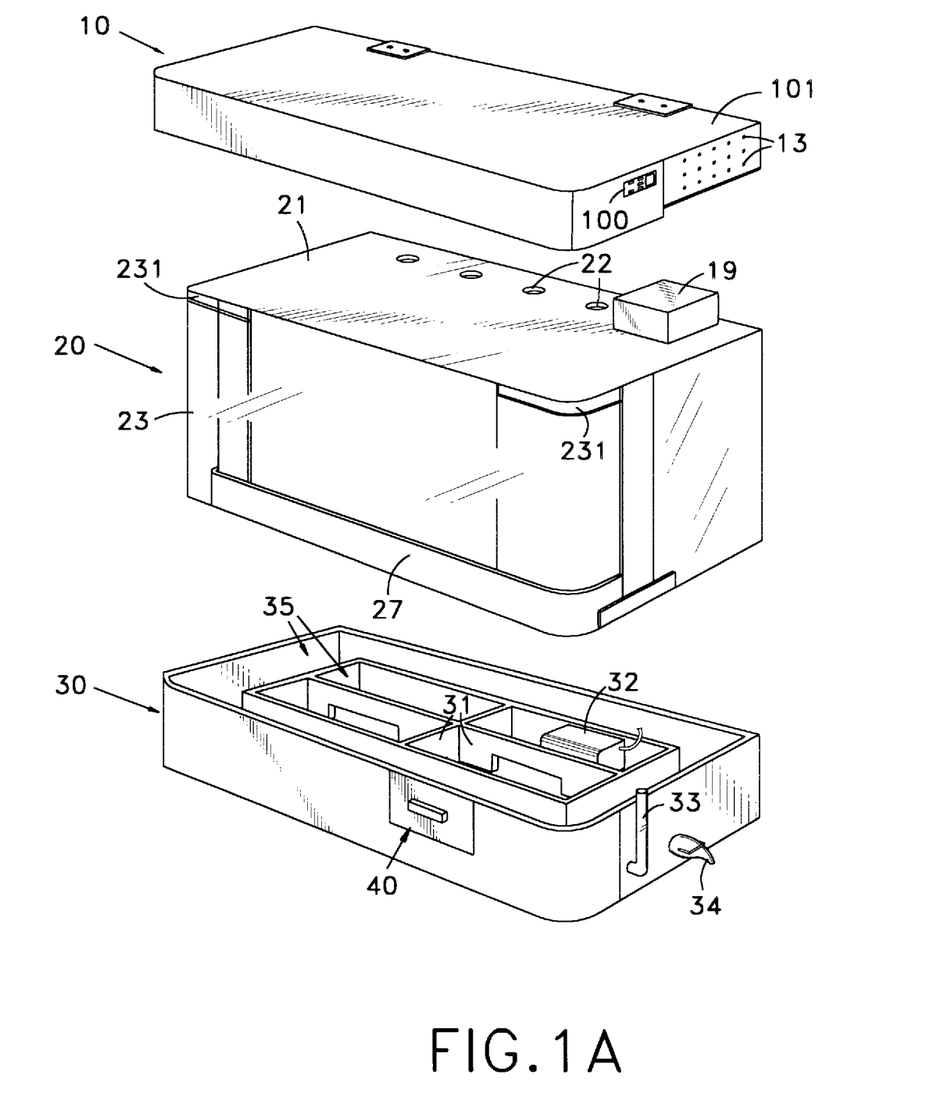
FIG. 1A is similar to FIG. 1, but showing the three integral units forming the view tank in an exploded state.

The view tank structure of the present invention may comprise a single tank substantially maintained to be enclosed as shown in FIG. 1, or three independent tank units assembled together as shown in FIG. 1A. In either structure, the view tank of the invention comprises an upper lid 101, and there is an upper partition plate 21 in the tank body to divide the latter into an upper tank section 10 and a middle tank section 20. In the upper tank section 10, there are a guide channel 18 and a fan 14. At least a part of the walls of the middle tank section 20, for instance, a wall 23, is transparent and may open to the front, as shown by imaginary lines in FIG. 2.

Figure 3:
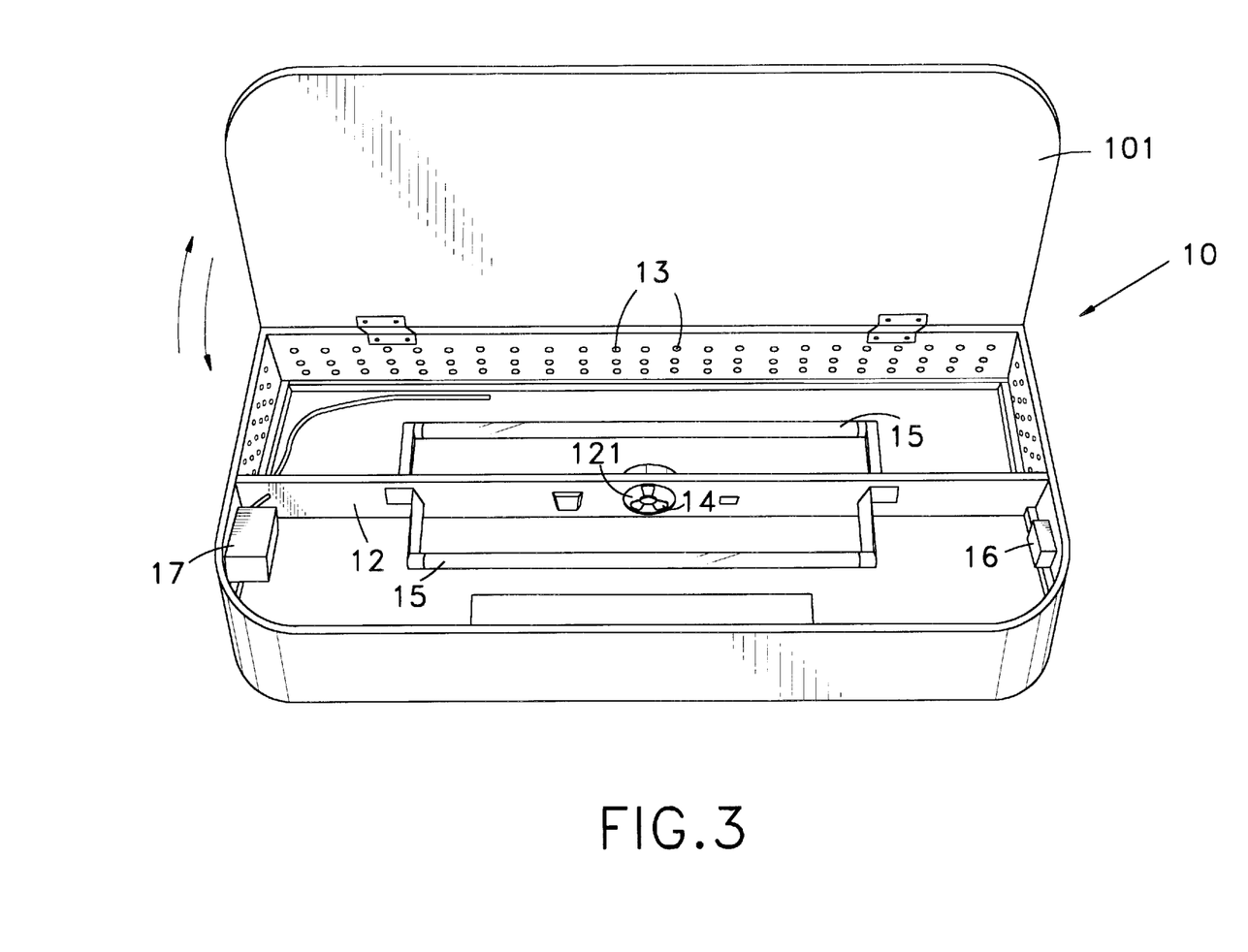
FIG. 3 is a structural view of the upper section of the view tank.

The view tank further has a lower partition plate 50 which divides the tank body into the middle tank section 20 and a lower tank section 30. In the lower tank section 30, there is a water reservoir 35 which is provided with a pump 32. Water may be pumped via a duct 29 to a fog generating box 19 for making fogging and misty scenes, and another duct 251 to a sprinkle valve 25 of the middle tank section 20 for watering the plants. The view tank is provided with an electric power supply means, such as a control switch 100 as shown in FIG. 1, or a timer 16 as shown in FIG. 3 for controlling a light 15, a fog generator 191 of the fog generating box 19, and the pump 32 in the water reservoir 35. The edge of the outer wall of the lower tank section 30 where the pump 32 is disposed is further provided with a water level indicator 33 and a water discharge valve 34 to facilitate observation of a water storing device in the water reservoir 35 of the lower tank section 30.

Figure 2:
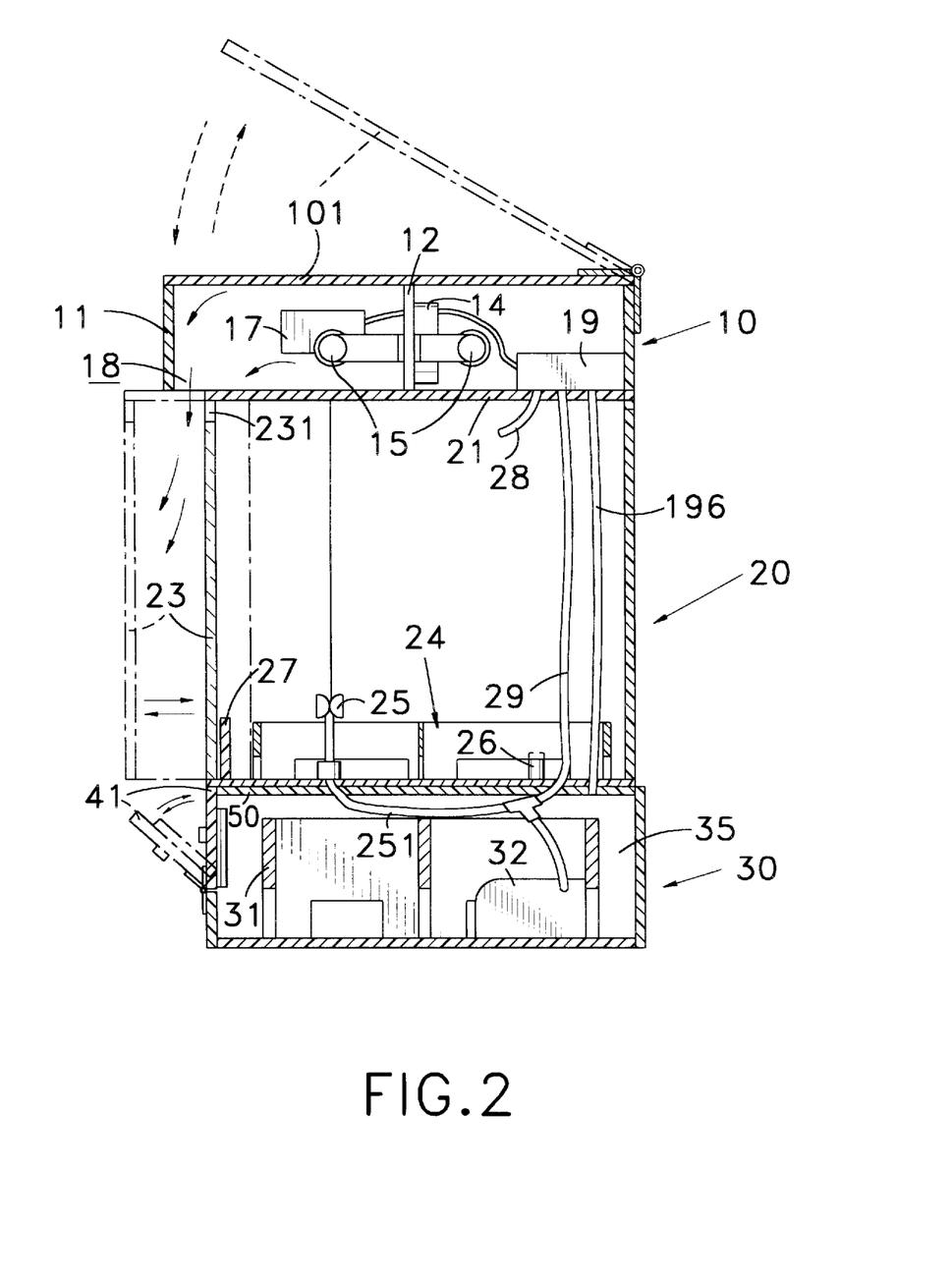
FIG. 2 is a sectional view taken along line II—II of FIG. 1.
Figure 4:
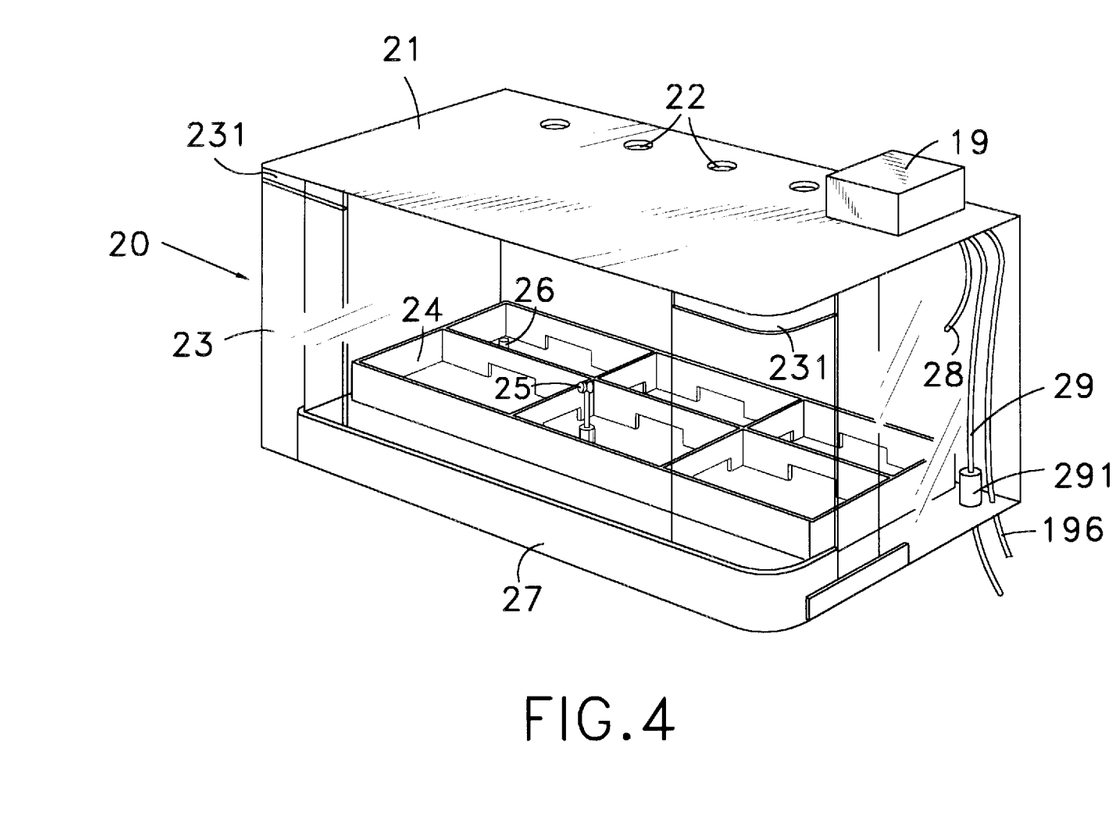
FIG. 4 is a structural view of the middle section of the view tank.

With reference to FIGS. 1, 2, and 3, the upper lid 10 shown by imaginary lines in the embodiment is openable. This can be achieved generally by providing hinge means at one side of the tank body, or utilizing rail means or other feasible means. In the upper tank section 10, there is a partition 12 which divides the tank body into two parts. The partition 12 is provided with a hole 121 for the fan 14 for drawing air in, and for mounting the light 15 so that the middle tank 20 may be illuminated. The light 15 may be selectively disposed at any one side of the light-permissible upper partition plate 21. At the first half of the upper tank section 10, i.e., the wall not provided with the air vents 13, an air pump 17 communicating with the fog generating box 19 may be disposed. In FIGS. 1 and 3, the peripheral walls of the second half of the upper tank section 10 are provided with multiple air vents 13. The air inside the middle tank section 20 may be drawn out by the fan 14 via a plurality of air outlets 22 in the upper partition plate 21, as shown in FIG. 4, and discharged from the middle tank section 20 via the guide channel 18, as shown in FIG. 2.

With reference to FIG. 2, the discharge of hot air from the middle tank section 20 is achieved via the guide channel formed after the upper tank section 10 and the middle tank section 20. Since the front side of the upper tank section 10 projects slightly from the middle tank section 20, and the size of the upper partition plate 21 is equivalent to the area of the upper side of the middle tank section 20, the respective front ends of the tank sections 10 and 20 are separated to define a gap. Due to the air current generated by the fan 14, the guide channel 18 may conduct the hot air generated by the electric current drive equipment of the upper tank section 10 and that produced by the plants in the middle tank section 20 to the outer rim of the transparent wall of the tank section 20, so that moisture in the ambient air will not condense on the outer walls of the tank section 20 to obstruct viewing.

As shown in FIG. 2, the openable wall 23 may be opened from the middle tank section 20 by rail means or other feasible structures and closed thereupon. The openable wall 23 may be provided with some hollow channels such as holes, or elongated grooves 231 as shown in the figures, thereon or at its four sides so that outside air may enter into the tank section 20 via the air channels for the plants' use. The upper rim of the lower partition plate 50 at the bottom side of the tank section 20 has a water-proof wall 27 for preventing excessive water supplied by the sprinkle valve 25 to the tank section 20 from overflowing out of the tank section 20. Water collected at the upper rim of the lower partition plate 50 may be guided into the lower tank section 30 via an overflowing duct 26 at the upper rim of the lower partition plate 50 ready to be pumped by the pump 32. The peripheral walls of the lower partition plate 50 and those of the tank section 20 are sealingly coupled. Besides, the upper rim of the lower partition plate 50 may be configured to form a lattice structure 24 so as to enhance its strength for supporting the weight of the scene and to prevent soil in the tank section 20 from being washed away with the water current. The respective ducts 196, 251, 28, and 29 passing through the lower partition plate 50 and the upper partition plate 21 may be positioned by bands 291, as shown in FIG. 6, or other suitable means at points of their passage.

Figure 5:
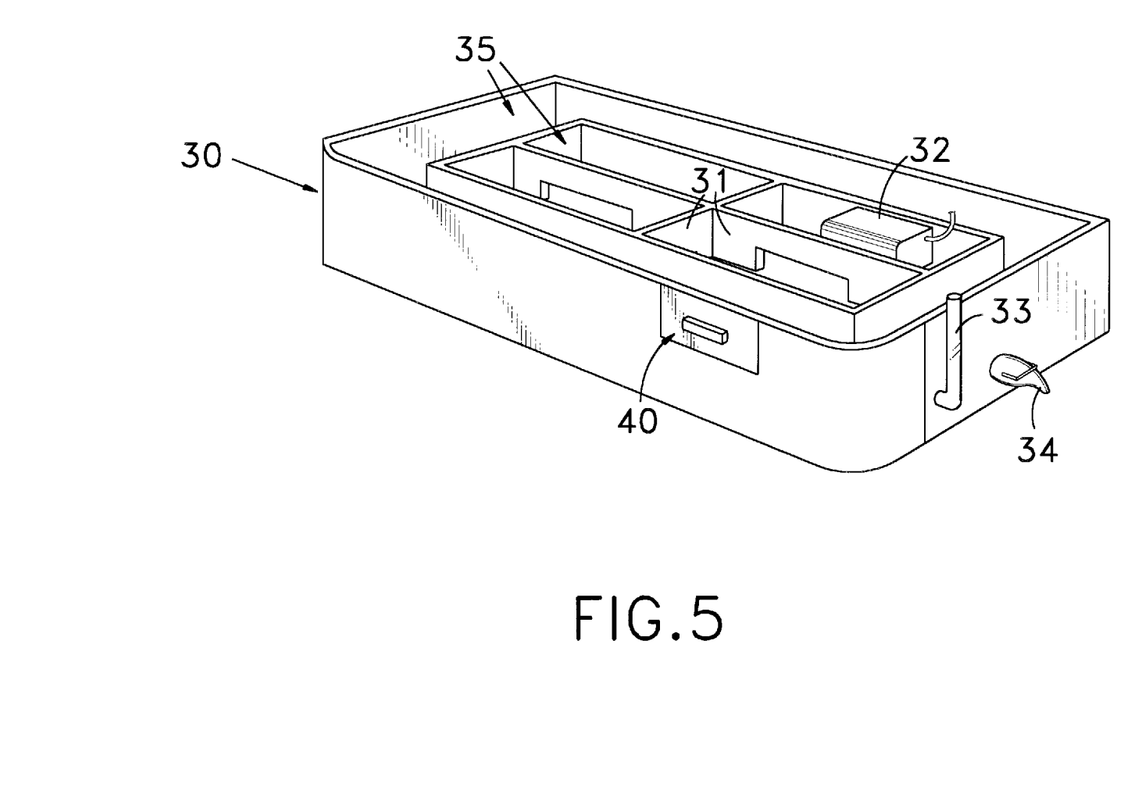
FIG. 5 is a structural view of the lower section of the view tank.
Figure 7:
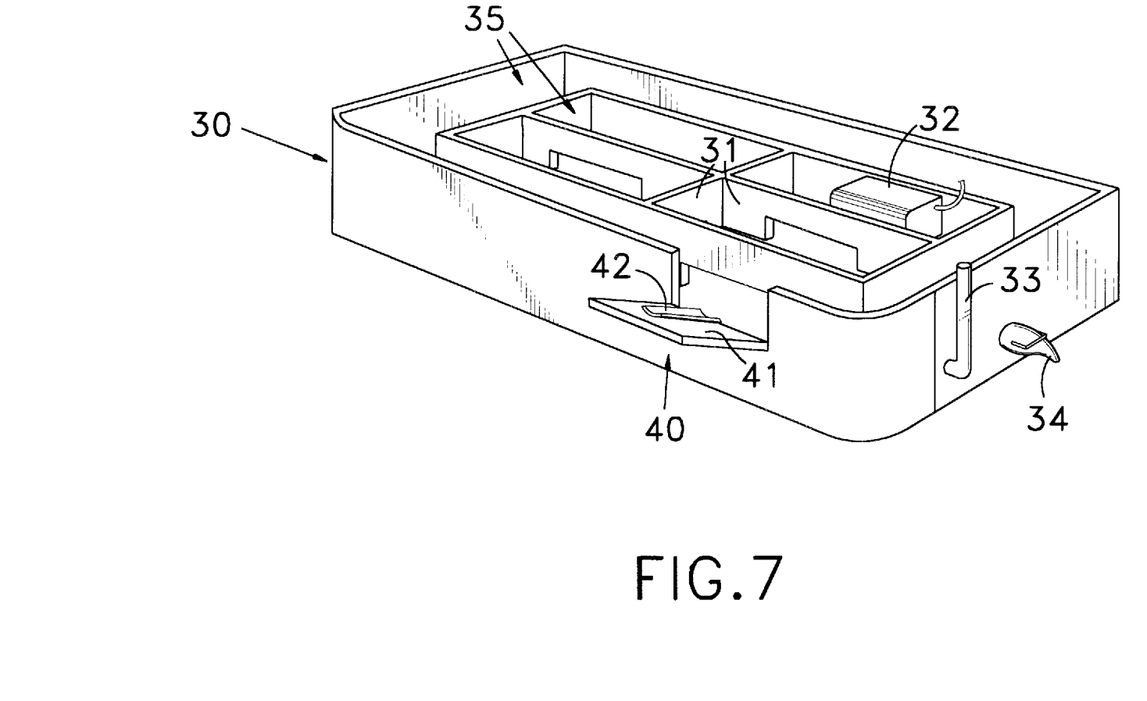
FIG. 7 is similar to FIG. 5, but showing a guide plate having been lifted.

Embodiments of the lower tank section 30 are shown in FIGS. 5 and 7. The water reservoir 35 is formed by four peripheral walls and a bottom side. If necessary, the upper rim of the bottom side of the water reservoir 35 may form a lattice structure 31 with bottom accesses so as to enhance the strength of the lower partition plate 50. The water reservoir 35 accommodates the pump 32, which is connected to the sprinkle valve 25 and the fog generating box 19 via ducts 251 and 29 respectively. As for the water level indicator 33 and water discharge valve 34 externally provided, they may monitor the water level of the water reservoir 35 and guide excessive water out. In the embodiment shown in FIG. 7, a part of the wall of the tank section 30 forms an upwardly openable guide plate 41 one side of which is provided with a semi-tubular water guide groove 42 having an opening orienting towards the interior of the tank section, constituting a water supply means 40. The guide plate 42 may be coupled to the tank section 30 by means of pins or in other feasible ways.

Figure 6:
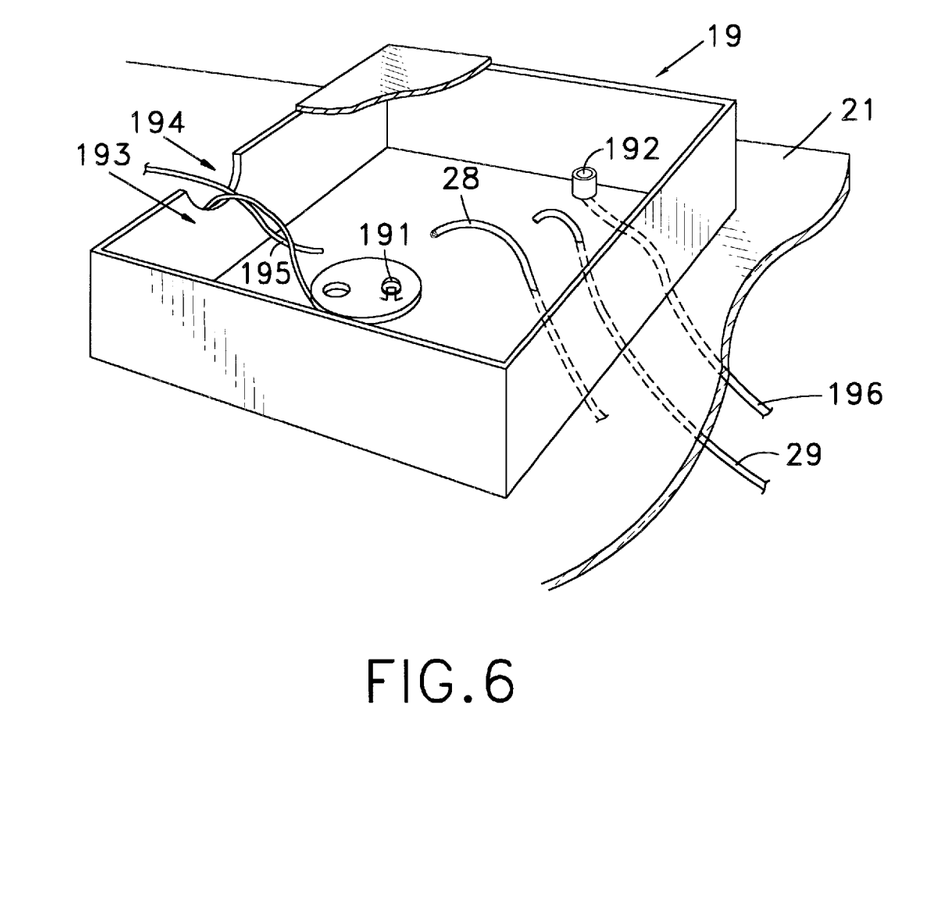
FIG. 6 is a top view of the fog generating box shown in FIG. 3.

The fog generating box 19 shown in FIGS. 6 and 2 may be directly sealingly coupled to the upper partition plate 21 to obviate use of a bottom plate, so that the upper partition plate 21 and the four peripheral walls of the tank 19 define a water tank 193. Alternatively, a pentagonal or hexagonal small tank having a bottom side may be used to form a water tight water tank. The water tank 193 accommodates therein the high frequency wave fog generator 191. There is also an overflowing duct 192 for guiding excessive water via the guide duct 196 into the water reservoir 35 of the tank section 30. In the embodiment, the fog generating box 19 is placed at the lower rim of the upper partition plate 21. For aesthetic considerations, the tank 19 may be placed at the upper rim of the upper partition plate 21 so that it may be enveloped by the tank section 10. The fog generating box 19 is provided with a slot 194 at a suitable position for passage of the guide duct 195, which conducts air thereinto from the air pump 17, so that fog generated in the box 19 may be speedily transported to the middle tank section 20 above via another slot through which the guide duct 28 passes. The fog generating box 19 further has a guide duct 29 connecting to the pump 32 for obtaining water required for making fog.

The opening wall 23 of the tank may be selectively formed of glass, acrylic, polyester or synthetic resin. Likewise, the upper partition plate 21 and the lower partition plate 50 may be formed of the same materials. Besides, they should be configured to have one side permitting light. A feasible way is to adhere a sticker to the partition plates. Alternatively, the partition plates may be configured to have foggy or misty surfaces so as to prevent the interior of the upper tank section 10 or the lower tank section 30 from being visible to the viewers, which may impair the aesthetic appearance of the scene or landscape.

Although the present invention has been illustrated and described with reference to the preferred embodiments thereof, it should be understood that it is in no way limited to the details of such embodiments, but is capable of numerous modifications within the scope of the appended claims.

What is claimed is:

1. A view tank, comprising:

a tank body substantially maintained to be enclosed, said tank body having an upper lid;

an upper partition plate disposed in said tank body, said upper partition plate dividing said tank body into an upper section and a middle section, each of which has its respective walls, one side of said upper partition plate having a light; said upper section having a guide channel and a fan, and said middle section having walls which are at least partly transparent, and an openable wall; said fan being capable of sending the hot air in said upper section via said guide channel to an outer rim of the transparent wall of said middle section;

a lower partition plate disposed in said tank body, said lower partition plate dividing said tank body into a middle section and a lower section, said lower section having its respective walls and a water reservoir;

a fog generating box, said fog generating box having a water tank and a fog generator disposed in said water tank, the fog generated by said fog generating box being supplied to the upper portion of said middle section;

a pump, said pump transferring the water in said water reservoir to said fog generating box and said middle section; and an electric power supply device for supplying and controlling electric currents to said light, said fog generator, and said pump.

2. The view tank as claimed in claim 1, wherein the respective walls of said upper section, said middle section, and said lower section are integral units joined together to form said tank body.

3. The view tank as claimed in claim 1, wherein said upper lid is openable.

4. The view tank as claimed in claim 1, wherein the walls of said upper section are slightly larger than and are separated from the walls of said middle section, forming an outlet of said guide channel.

5. The view tank as claimed in claim 1, wherein said upper section further has a partition for mounting of said fan, and dividing said upper section into an air inlet side and an air outlet side, said partition having a hole relative to said fan.

6. The view tank as claimed in claim 5, wherein said upper section has a plurality of air vents in the walls thereof at the air inlet side.

7. The view tank as claimed in claim 1, wherein said upper partition plate is further provided with an air pump at one side thereof for supplying air to said fog generator.

8. The view tank as claimed in claim 1, wherein said fog generating tank is located at said upper partition plate.

9. The view tank as claimed in claim 1, wherein said upper partition plate and said lower partition plate are respectively provided with a plurality of holes for passage of guide ducts, said upper partition plate further having holes for ventilation of air between said middle section and said upper section.

10. The view tank as claimed in claim 1, wherein said upper section is provided with an electric power control device comprising a timer and a control switch, said electric power control device controlling said pump, said fog generator and said light.

11. The view tank as claimed in claim 1, wherein said middle section has a sprinkle valve connected to said pump via a guide duct.

12. The view tank as claimed in claim 1, wherein said middle section has a water proof-wall at an upper rim of said lower partition plate at the inner side of said openable wall thereof.

13. The view tank as claimed in claim 1, wherein said lower partition plate has an overflowing duct at an upper rim thereof.

14. The view tank as claimed in claim 1, wherein said lower partition plate has a lattice structure at an upper rim thereof.

15. The view tank as claimed in claim 1, wherein the walls of said lower section has a part thereof having an outwardly openable guide plate for supplying water.

16. The view tank as claimed in claim 1, wherein the walls of said lower section are provided with a water level indicator and a water discharge valve communicating with said water reservoir.

17. The view tank as claimed in claim 15, wherein said guide plate has a semi-tubular water guide groove with an opening orienting towards the interior of said tank body.

* * * * *